May 13, 1958

W. B. LOVERIDGE 2,834,167

MILK BOTTLE CASE LOADING MACHINE

Filed Nov. 18, 1953

INVENTOR.
WILLIAM B. LOVERIDGE
BY
*H. G. Manning*
ATTORNEY

May 13, 1958  W. B. LOVERIDGE  2,834,167
MILK BOTTLE CASE LOADING MACHINE
Filed Nov. 18, 1953  5 Sheets-Sheet 2

INVENTOR.
WILLIAM B. LOVERIDGE
BY
H. G. Manning
ATTORNEY

May 13, 1958　　　W. B. LOVERIDGE　　　2,834,167
MILK BOTTLE CASE LOADING MACHINE
Filed Nov. 18, 1953　　　　　　　　　　　　5 Sheets-Sheet 3

INVENTOR.
WILLIAM B. LOVERIDGE
BY
H. G. Manning
ATTORNEY

May 13, 1958
W. B. LOVERIDGE
2,834,167
MILK BOTTLE CASE LOADING MACHINE
Filed Nov. 18, 1953
5 Sheets-Sheet 4
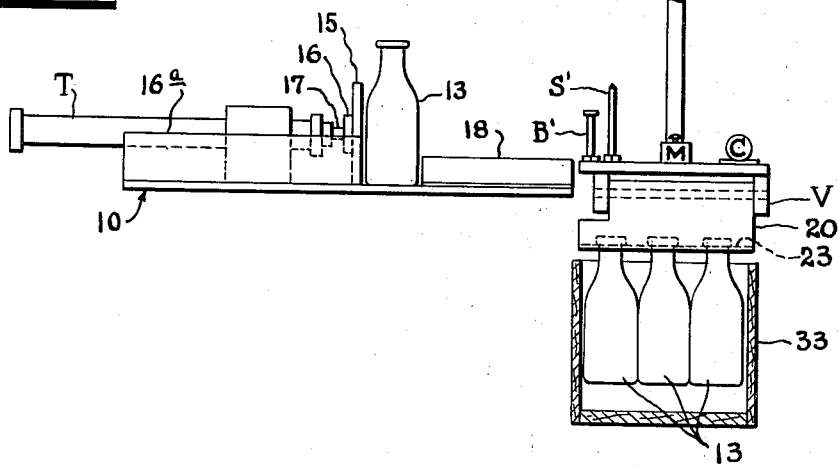
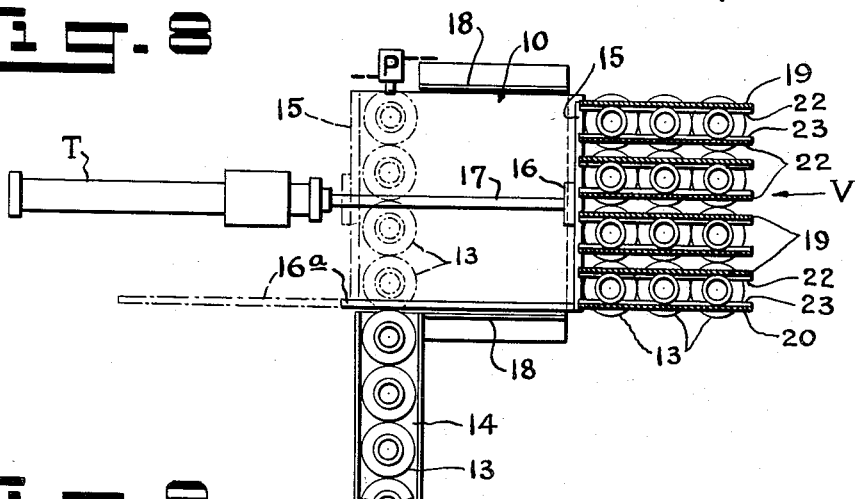
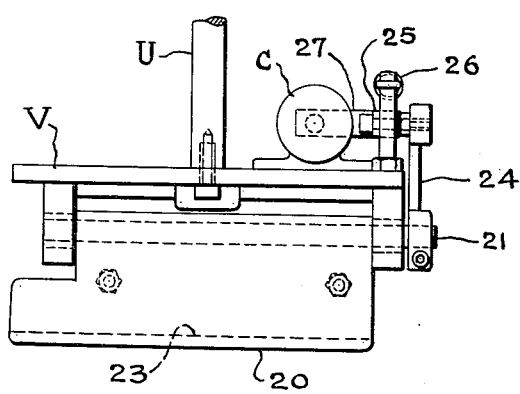
INVENTOR.
WILLIAM B. LOVERIDGE
BY
H. G. Manning
ATTORNEY May 13, 1958  W. B. LOVERIDGE  2,834,167
MILK BOTTLE CASE LOADING MACHINE
Filed Nov. 18, 1953  5 Sheets-Sheet 5
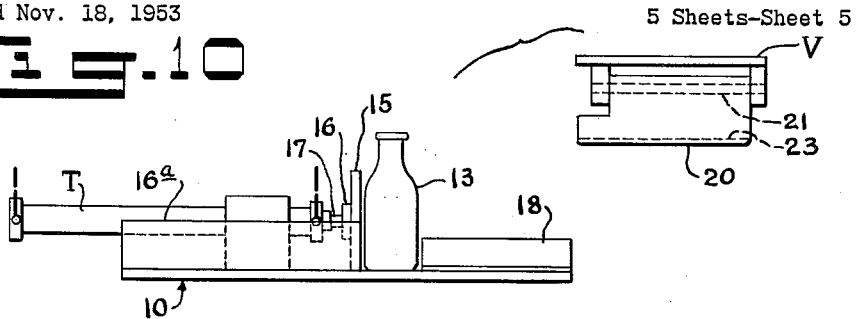
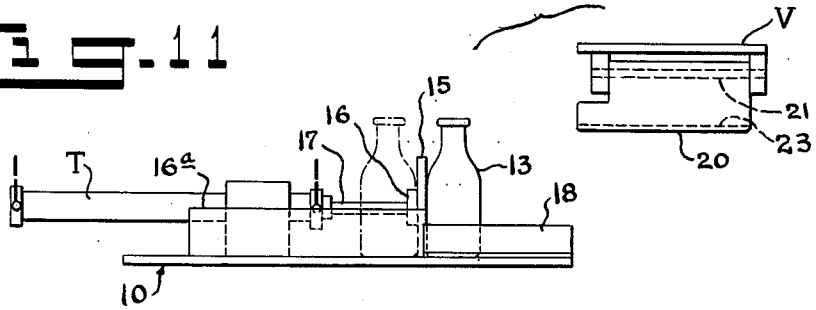
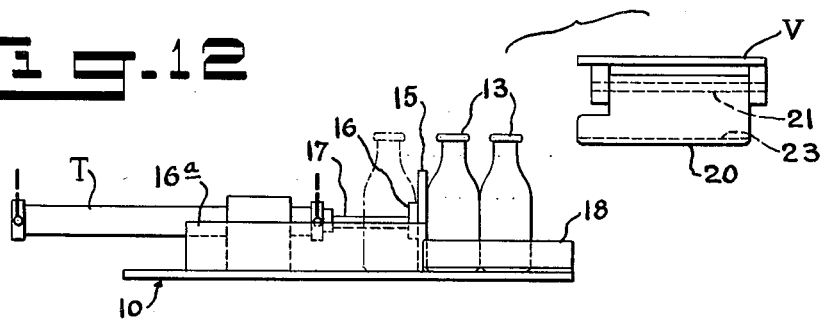
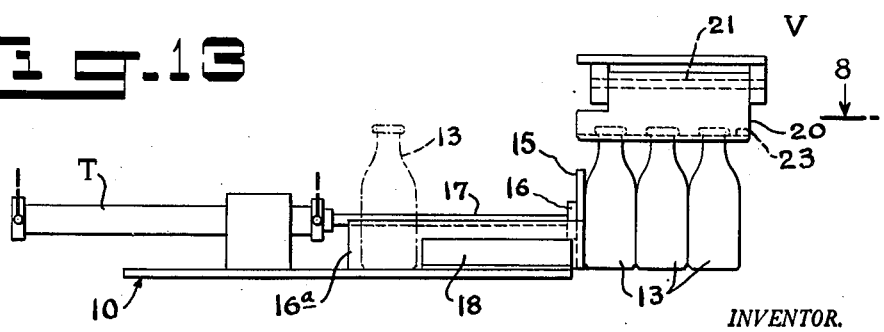
INVENTOR.
WILLIAM B. LOVERIDGE
BY
ATTORNEY

United States Patent Office 2,834,167
Patented May 13, 1958

2,834,167

MILK BOTTLE CASE LOADING MACHINE

William Barnum Loveridge, Prospect, Conn.

Application November 18, 1953, Serial No. 392,849

17 Claims. (Cl. 53—61)

This invention relates to dairy machinery, and more particularly to an apparatus for loading milk bottles into cases.

One object of the present invention is to provide an apparatus of the above nature in which bottles, arriving in single file on a conveyor, are grouped into three rows of four each on a table, and are then transferred in rectangular groups of twelve bottles to a carrier for lowering them into the case located beneath it.

A further object is to provide an apparatus of the above nature in which the carrier has a plurality of cooperating fixed and movable jaws for suspending the bottles while they are being lowered into the case.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawings,

Fig. 7 is a schematic side view showing the horizontal plunger, the loading table, and the bottle carrier.

Fig. 8 is a top plan view of the same.

Fig. 9 is a side view, on a larger scale, of the bottle carrier and the vertical plunger which lowers the bottles into the case.

Fig. 10 is a schematic side view of the horizontal plunger for pushing the bottles laterally toward the holding jaws of the carrier.

Fig. 11 is a similar side view, showing the position of the horizontal plunger after the first row of bottles has been fed to the right one space, another row of bottles being shown in dotted lines ready to be pushed laterally upon the loading table from the conveyor.

Fig. 12 is a similar side view, showing in full lines the position of two rows of four bottles after they have been pushed by the horizontal plunger two spaces—a third row of bottles being shown in dotted lines ready to be received laterally from the conveyor.

Fig. 13 is a similar view, showing a single row of bottles in dotted lines as they are received laterally from the conveyor, and showing in full lines three rows of bottles as they are being pushed longitudinally by the horizontal plunger into the jaws of the carrier prior to lowering said bottles into the case beneath.

Figure 1:
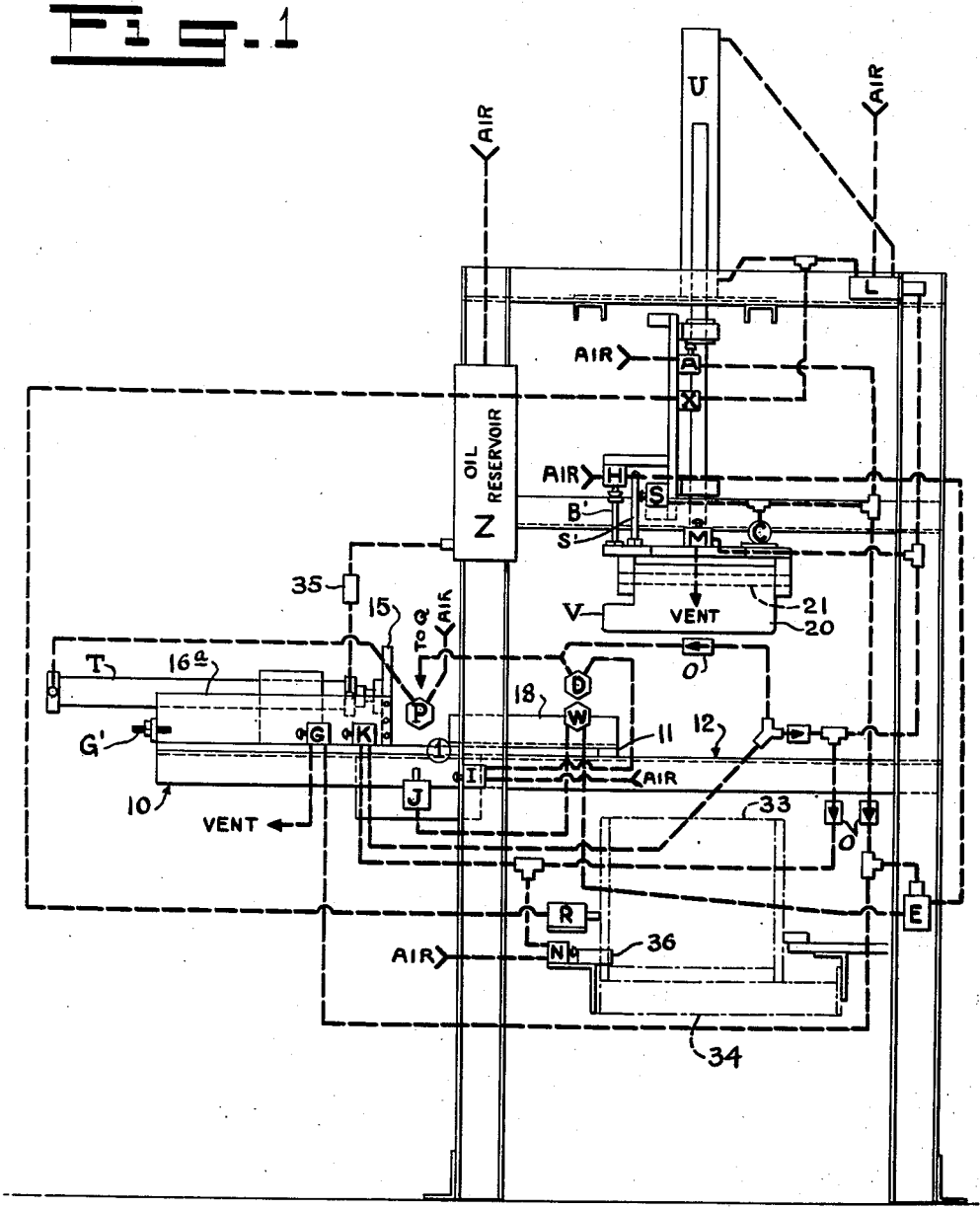
Fig. 1 represents a side view, showing schematically, the layout of the air pipes and the connections between the control valves and the operating plungers of the apparatus.

Referring now to the drawings, in which like reference numerals denote corresponding parts throughout the several views, the numeral 10 indicates a bottle loading table rigidly connected on one edge 11 to a supporting frame 12, herein shown as made from angle iron, but which may also be constructed of tubing, within the scope of this invention.

Alongside the loading table 10, provision is made of a lateral conveyor 14 from which a plurality of bottles 13 are delivered in succession in single file to the table 10.

A trip button P is located at one side of the table 10 in alignment with the bottles 13 coming from the conveyor 14.

The numeral 15 indicates a pusher plate having a hub 16 rigidly connected to a horizontal piston plunger 17, located in a pneumatic cylinder T, for transferring the bottles 13 in rows of four each to a carrier V located at the right, connected to a piston of an air cylinder U, as clearly shown in Fig. 1

The pusher plate 15 has a side stop flange 16a against which the bottles 13 are pressed by the conveyor 14, said flange 16a serving to hold said bottles 13 on said conveyor when the pusher plate is in its forward position, as shown in Fig. 8. The numeral 18 indicates a guide plate on the side of the table 10.

The carrier V is provided with a plurailty of fixed jaws 19 and a like number of cooperating movable jaws 20, the latter being moved simultaneously by means of mechanism to be described later.

The movable jaws 20 are pivotally connected by pins 21 to the carrier V, and both sets of jaws 19, 20 have inturned hooks 22, 23, respectively, which are adapted to engage underneath the top beads 13a of the bottles 13.

Provision is also made of a plurality of upstanding links 24 for connecting the movable jaws 20 with a single movable horizontal top bar 25, whereby all of the movable jaws 20 will be opened and closed simultaneously with respect to the fixed jaws 19.

Figure 3:
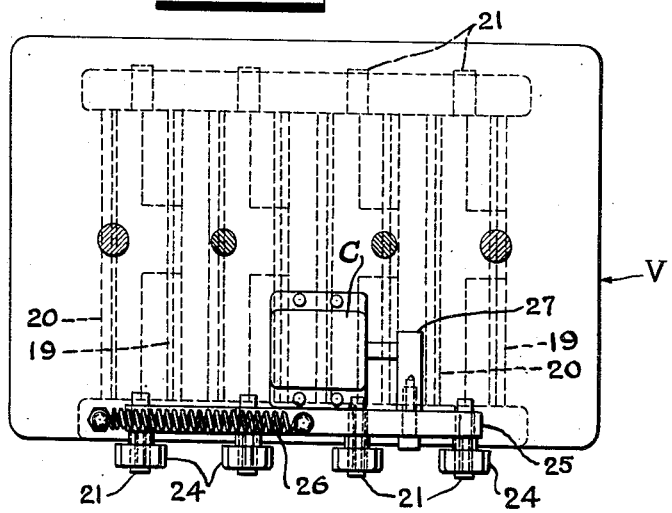
Fig. 3 is a top view of the bottle carrier, showing the linkages for simultaneously swinging the movable jaws away from the fixed jaws into bottle releasing positions.
Figure 4:
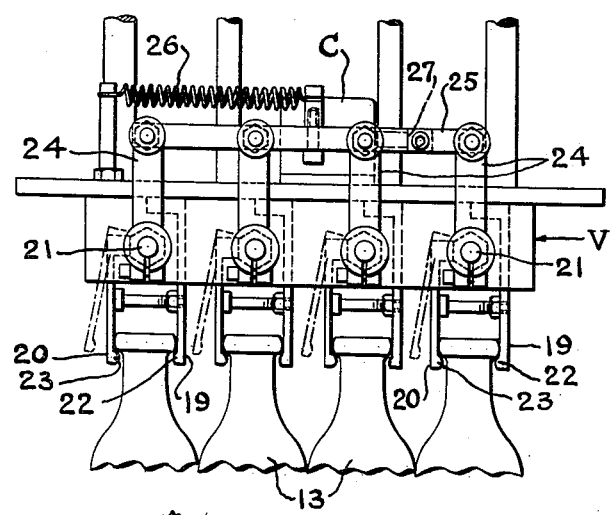
Fig. 4 is an end view of the same.
Figure 5:
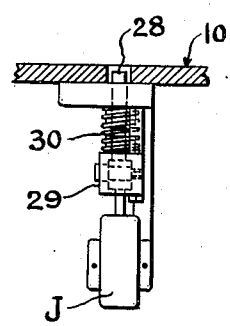
Fig. 5 is a fragmentary end view of the automatic trip mechanism operating on the third stroke of the horizontal plunger for releasing the trigger to permit the bottles to be moved from the table into the holding jaws of the carrier.

The movable jaws 20 will be maintained in closed position around the beads 13a of the bottles 13 by a single common closing coiled spring 26 (Figs. 3 and 4).

In order to open all of the jaws 20 simultaneously, provision is made of a small horizontal jaw-opening air cylinder C, the piston of which presses against a side arm 27 on the movable horizontal top bar 25.

Figure 6:
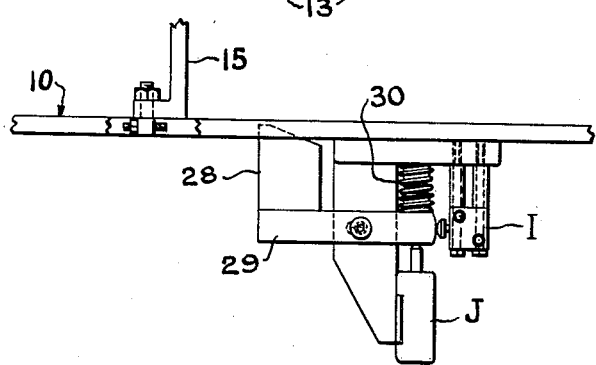
Fig. 6 is a side view of the same, showing the trigger in locked position.

As shown most clearly in Fig. 6, provision is also made of a trigger stop 28 carried on a bar 29 which is pressed by a coiled spring 30.

A button I is also provided which serves to reverse the horizontal plunger 17 by means of an air cylinder Q which reverses the trip button P.

Figure 2:
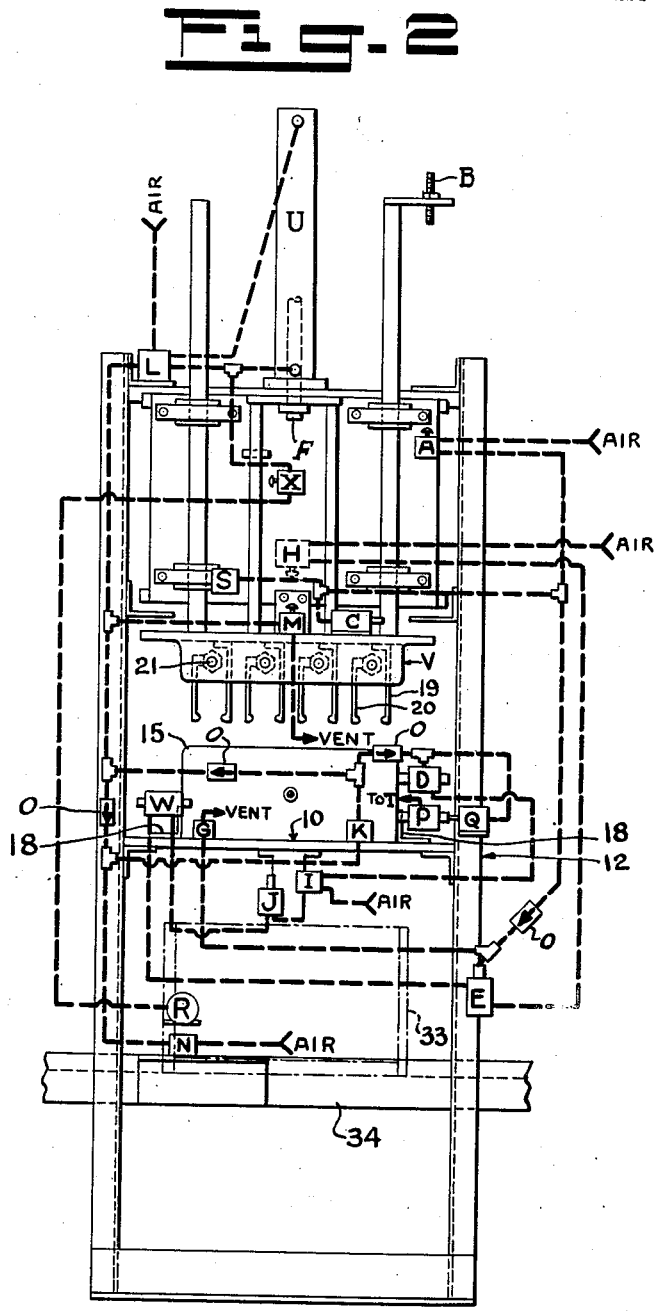
Fig. 2 is an end view of the same, showing the stops and trips which operate the control valves at the ends of the up and down strokes of the bottle carrier plunger.

A valve D is also provided to cut off the air supply to the reversing button I (Fig. 2).

The letters in the following list appearing on the drawing indicate parts of the apparatus having the following purposes:

A is a carrier-operating valve. (Figs. 1 and 2).
B is an adjustable tripper for the valve A. (Fig. 2).
B-1 is an adjustable tripper for the valve H. (Fig. 1).
C is the jaw-opening air cylinder. (Fig. 4).
D is a cut-off valve. (Figs. 1 and 2).

E is a pilot operated interlocking valve. (Figs. 1 and 2).
F is a tripper.
G is a vent valve. (Fig. 1).
G-1 is an adjustable tripper for valves G and K. (Fig. 1).
H is an interlocking valve which supplies air to the valve E. (Figs. 1 and 2).
I is a reversing button. (Figs. 1 and 2).
J is an air cylinder. (Figs. 1 and 2).
K is a valve which reverses the plunger 17 in the air cylinder T and starts the plunger in the air cylinder U. (Figs. 1 and 2).
L is a valve. (Figs. 1 and 2).
M is a valve which reverses the plunger in air cylinder U. (Figs. 1 and 2).
N is a safety valve. (Figs. 1 and 2).
O are check valves. (Figs. 1 and 2).
P is a trip button. (Figs. 1 and 2).
Q is an air cylinder. (Fig. 2).
R is an air cylinder which operates a plunger to push a case 33 of bottles onto its adjacent conveyor 34. (Figs. 1 and 2).
S is a valve which closes the movable jaws 20. (Figs. 1 and 2).
S-1 is a tripper for the valve S. (Fig. 1).
T is a horizontal air cylinder. (Figs. 1, 10, 11, 12, 13).
U is a vertical air cylinder. (Figs. 1, 2, 9).
V is the bottle carrier.
W is a valve. (Fig. 2).
X is a valve which operates the air cylinder R. (Figs. 1 and 2).
Z is an oil reservoir. (Fig. 1).

OPERATION

In operation, when the trip button P is engaged by a bottle 13, the horizontal plunger 17 of the cylinder T will force a row of four bottles 13, which have been delivered to the loading table 10 from the conveyor 14, to the right on the first stroke (see Fig. 11).

On the second stroke, the plunger 17 will push the original four bottles and another row of four more bottles, parallel thereto, along the table 10 to the right (Fig. 12).

The next stroke of the plunger 17 (Fig. 13) will move three parallel groups of four bottles each to the right, and off the table 10, causing the beads 13a of all of the bottles 13 to be received by the four sets of hooks 22, 23 of the carrier jaws 19, 20 and suspended over the empty bottle case 33, located beneath it, said case 33 then being supported on a traveling conveyor 34.

The vertical plunger U will then cause the carrier V to descend and deposit a dozen bottles 13 in the case 33, said case being temporarily held stationary by stops located above the continuously moving conveyor 34 on which the cases 33 are supported.

When the pusher plate 15 moves forwardly with the first row of four bottles 13, it will advance said row of bottles until it strikes the trigger stop 28 (Fig. 6). Force will then be exerted by the bar 29 upon the reversing button I which causes the plunger 17 to retract at the ends of the first and second strokes.

At the end of the third stroke of the plunger 17, the supply of air to the button I will be cut off by the valve D operated by the group of twelve bottles supported by the table 10.

At the same time that the cut off valve D is operated by the group of twelve bottles, the valve W will also be so operated as to supply air to the cylinder J which causes the stop 28 to retract and release the pusher plate 15, which plate 15 will now move to the extended position as shown in Fig. 13, pushing the twelve bottles into the carrier V. At the end of this movement of the plate 15, the tripper G1 will operate the valve K and reverse the plunger 17 in the cylinder T, returning the plate 15 to its starting position.

In other words, on the third forward stroke of the plunger 17, the bottles 13 will close the valve D, thus preventing the valve I from reversing the plunger 17 again. At the same time, the bottles 13 will open the valve W. Air will now pass through the valve W to the cylinder J and release the plunger 17.

Also on the upstroke of the vertical plunger U, the valve X will be actuated to release the stop 36, allowing said case to move onto the conveyor 34.

It will be understood that the bottle case 33 must be held by the stop 36 on the conveyor 34, and that the safety valve N will be actuated prior to the movement of the plunger 17 to transfer the bottles from the loading table 10 to the bottle carrier 18.

The cycle of operations for cylinder T is as follows:

(1) Four bottles 13 move to valve P from conveyor belt 14 and actuate valve P.

(2) Valve P admits air to cylinder T which moves to stop 28. Stop valve I reverses cylinder T thru cylinder Q and valves P and D.

(3) After cylinder T returns to start position, four more bottles 13 move into position and actuate valve P. T now repeats its cycle.

(4) On the third forward stroke of T, bottles close valve D, thus preventing valve I from reversing T again. At the same time these bottles open valve W.

(5) Air now passes thru valve W from valves E and H to cylinder J, which releases stop 28 which restricts stroke of cylinder T.

(6) Cylinder T now moves forward, pushing bottles 13 onto carrier rack V. Cylinder T then actuates valve K when all bottles are located on rack. K now starts "cycle of operations of cylinder U" by dumping air to valve L. Valve K also reverses cylinder T at this time.

(7) Valve G is also opened at the end of stroke of cylinder T. This dumps air from pilot of valve E, closing valve E until the next cycle.

The cycle of operations for cylinder U is as follows:

(1) The tripper B actuates valve A at full down position of bottle holder V, releasing bottles by action of cylinder C. Air from valve A also opens valve E.

(2) At the bottom of stroke of cylinder U, tripper F opens valve M, which reverses cylinder U. On the up stroke of cylinder U, valve S is opened by rod S1, releasing cylinder C, thus closing jaws of bottle carrier V. Also on up stroke of cylinder U, valve X actuates cylinder R which pushes off loaded box of bottles along conveyor.

(3) At top of stroke of cylinder U, tripper B1 opens valve H which admits air thru open valve E to valve W. At this point bottle carrier V is in position to receive bottles from loading table.

(4) A bottle case must be in position against its stop 36 on the conveyor, and actuating safety valve N before cylinder T can move any bottles from loading table to bottle carrier V.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus described the invention, what is claimed as new and for which it is desired to secure Letters Patent is:

1. In an apparatus for loading articles into a rectangular packing case, a table, a conveyor for feeding a plurality of said articles upon said table in a single row, a vertically movable pneumatically operated article carrier at one end of said table, a pusher plate at the other end of said table at right angles to said conveyor for moving said plurality of articles simultaneously along said table at right angles to said conveyor into said bottle carrier, and pneumatically operated means to cause said carrier to descend with said plurality of rows of articles and deposit them simultaneously into a packing case beneath said carrier.

2. The invention as defined in claim 1, in which said carrier is provided with a plurality of pairs of closed article-holding jaws arranged in alignment with said plurality of rows respectively, and means for opening said jaws sufficiently to allow said plurality of articles to drop simultaneously a short distance into said packing case at the end of the downward movement of said carrier.

3. The invention as defined in claim 2, in which a conveyor is provided to move said packing case, after it has been filled with articles, out of said apparatus.

4. The invention as defined in claim 1, in which said pusher plate has a stop flange on the edge thereof adjacent the edge of said conveyor to prevent additional articles from passing onto said table when said pusher plate is pushing said plurality of rows of articles into said carrier.

5. The invention as defined in claim 1, in which the portion of said table opposite from the end of said conveyor is provided with a rear guide plate to hold said plurality of rows of articles from sliding off said table.

6. The invention as defined in claim 2, in which said carrier is provided with a casing for supporting a plurality of fixed article-engaging jaws arranged in a plurality of parallel rows, and a like number of movable article-engaging jaws similarly arranged located adjacent said fixed jaws.

7. The invention as defined in claim 6, in which all of said jaws have inwardly-extending hooks on the lower ends thereof for engaging under the articles to suspend them in carrying position.

8. The invention as defined in claim 6, in which a plurality of links are connected to each of said movable article-engaging jaws, respectively, all of said links being pivotally connected to a common crossbar, and means to move said crossbar for swinging said movable jaws in unison to permit said articles to drop simultaneously into said case.

9. The invention as defined in claim 8, in which said crossbar is spring pressed to urge said movable jaws into closed article holding position.

10. In an apparatus for loading beaded milk bottles into a rectangular packing case, a table, a conveyor for delivering a first row of four bottles in single file upon said table, a pusher plate for moving said first row of four bottles at right angles to said conveyor one bottle space along said table, a vertically movable bottle carrier at the opposite end of said table from said pusher plate, means for causing said conveyor to deliver a second row of four bottles in single file upon said table, parallel to said first row of four bottles, means to cause said pusher plate to advance said first and second rows of four bottles each along said table another bottle space, means for causing said conveyor to deliver a third row of four bottles in single file upon said table parallel with said second row of four bottles, means to cause said pusher plate to advance all three rows of bottles off said table into said bottle carrier, and means to cause said carrier to descend and deposit said twelve bottles simultaneously into a packing case beneath it.

11. The invention as defined in claim 3, in which a stop is provide adjacent said packing case conveyor for normally preventing said case from being moved thereby, and means responsive to the upstroke of said carrier to release said case conveyor stop and permit said case to be moved out of said apparatus by said case conveyor.

12. The invention as defined in claim 10, in which a trigger stop is provided at the end of said table opposite from said pusher plate, and means are provided operative in response to the actuation of said trigger stop by the movement of said first and second rows of four articles each along said table at right angles to said conveyor to cause said pusher plate to reverse its movement and return to its starting point.

13. The invention as defined in claim 12, in which trigger means are provided which are operative at the end of the third stroke of said pusher plate to release said stop and permit said pusher plate to move an additional distance to deliver all twelve of said articles into said carrier.

14. The invention as defined in claim 13, in which means are provided operative at the end of the third stroke of said pusher plate to prevent reversal thereof until said twelve articles have been received in said carrier.

15. The invention as defined in claim 1, having means to lift said article carrier after it has deposited the articles in said packing case, said lifting means having a lost motion connection with said carrier in order to prevent injury to said carrier when said articles engage said packing case.

16. In an apparatus for loading articles into a rectangular packing case, a table, a conveyor for delivering a first row of four of said articles in single file upon said table, a pusher plate for moving said first row of four articles at right angles to said conveyor one article space along said table, a vertically movable article carrier at the opposite end of said table from said pusher plate, means for causing said conveyor to deliver a second row of four articles in single file upon said table parallel to said first row of four articles, means to cause said pusher plate to advance said first and second rows of four articles each along said table another article space, means for causing said conveyor to deliver a third row of four articles in single file along said table parallel with said second row of four articles, means to cause said pusher plate to advance all three rows of twelve articles off said table into said article carrier, and means to cause said carrier to descend and deposit said twelve articles simultaneously into a packing case beneath it.

17. In an article crating machine, a conveyor for delivering articles in line to said machine, means for transferring groups of said articles from said conveyor and marshalling them upon a fixed table in spaced relationship into a group pattern conforming to the positions they will occupy in a crate, a crate conveyor located laterally of said marshalling table, a carrier frame located above said crate conveyor, a plurality of article gripping devices suspended from said carrier frame and conforming to the pattern of said marshalled group of articles, means for operating said gripping devices, to release the articles gripped thereby when said articles are placed in position within said crate, pneumatic means for actuating said frame and said gripper article releasing means, and control means for automatically operating said moving parts in sequence in a cycle of operation.

References Cited in the file of this patent

UNITED STATES PATENTS

| | | |
|---|---|---|
| 1,243,407 | Hawthorne | Oct. 16, 1917 |
| 2,643,043 | Okulitch | Jan. 23, 1953 |
| 2,730,279 | Enock | Jan. 10, 1956 |